United States Patent [19]

Gerber

[11] 4,418,990

[45] Dec. 6, 1983

[54] EYEGLASSES AND OTHER LENSES OF VARIABLE FOCAL LENGTH AND MEANS AND METHOD FOR VARYING SUCH FOCAL LENGTH

[75] Inventor: Heinz J. Gerber, West Hartford, Conn.

[73] Assignee: Gerber Scientific, Inc., South Windsor, Conn.

[21] Appl. No.: 284,782

[22] Filed: Jul. 20, 1981

[51] Int. Cl.³ .............................................. G02C 1/00
[52] U.S. Cl. ...................................... 351/41; 351/158
[58] Field of Search ................. 351/41, 209, 210, 158; 350/419

[56] References Cited

U.S. PATENT DOCUMENTS 1,269,422  6/1918  Gordon ............................. 350/419

Primary Examiner—John K. Corbin
Assistant Examiner—Rodney B. Bovernick
Attorney, Agent, or Firm—McCormick, Paulding & Huber

[57] ABSTRACT

An eyeglass apparatus having a variable focal length lens and an associated method for varying the focal length of the lens uses a lens having a focal length which is variable as pressure along the lens is varied. Focal length adjusting mechanisms carried by the eyeglass frames provide for manual or automatic adjustment of the lens focal length.

9 Claims, 8 Drawing Figures

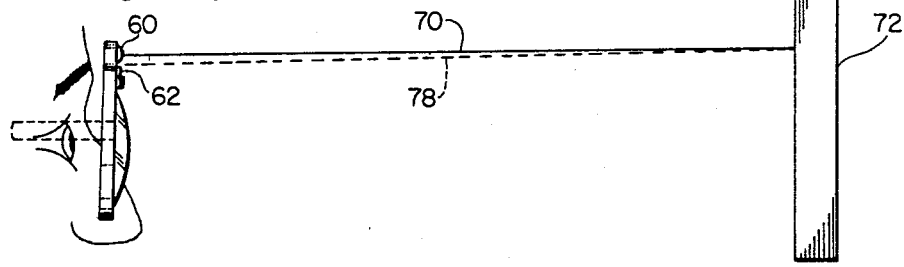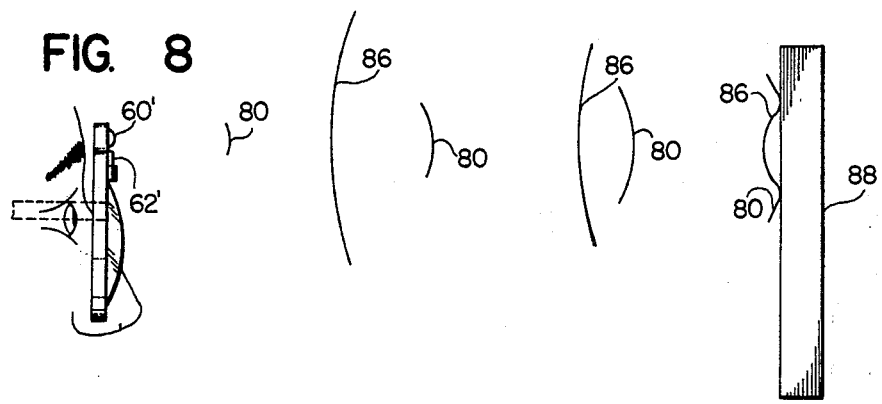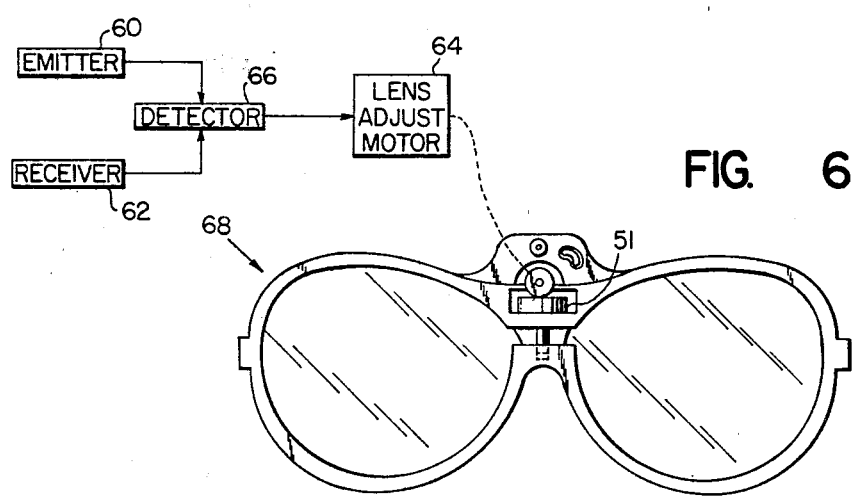

EYEGLASSES AND OTHER LENSES OF VARIABLE FOCAL LENGTH AND MEANS AND METHOD FOR VARYING SUCH FOCAL LENGTH

BACKGROUND OF THE INVENTION

The present invention relates to eyeglasses and other lenses having variable focal lengths, and deals more particularly with improvements in the structure of such lenses and in the means and methods for achieving focal length variations therein.

Variable focal length lenses are used in numerous applications requiring a variation of the focus of light rays. In vision compensation applications, such lenses are used in eyeglasses and magnification equipment, and in photographic applications are used in cameras.

It is a general object of the present invention to provide a new and improved variable focal length lens and a means and method for adjusting the focal length of such lens.

SUMMARY OF THE INVENTION

This invention resides in a method and apparatus for focusing light rays by means of a lens having a variable focal length. In one embodiment of the apparatus of this invention, a variable focal length lens assembly includes a lens, a lens holder, and focal length adjusting means. The lens has two lens surfaces and a circumferential marginal portion and consists entirely of a resiliently deformable light conducting material. The focal length of the lens is variable as the degree of pressure applied along the marginal portion of the lens is varied. The lens holder substantially surrounds the lens and engages the marginal portion so as to apply the desired pressure to the lens and is adjustable to vary that pressure.

The invention also resides in the focal length adjustment being controlled either manually or automatically. In an embodiment of the invention utilizing a manual control, a screw or the like cooperating with the lens holder can be adjusted by the user to vary the lens focal length until the user senses that light rays traveling from an object have reached a desired focus. In an embodiment of the invention utilizing an automatic control, a range finder, located on or near the lens assembly, senses the distance from the lens assembly to an object to be brought into focus and sends command signals to the focal length adjusting means which adjusts the focal length in response to such command signals.

The invention also comprehends and resides in the idea of using variable focal length lenses of the foregoing type, made entirely of a resiliently deformable light conducting material, in a pair of eyeglasses in combination with either manual or automatic means for achieving the focal length adjustment, and it also comprehends and resides in the idea of using variable focal lenses of any convenient sort in a pair of eyeglasses in combination with an automatic focal length adjustment means having a range finder using a signal projected to and reflected from the object being viewed.

BRIEF DESCRIPTION OF THE DRAWINGS

FIG. 6 is a view showing in block diagram form the control circuit for the automatic adjustment of focal length in the eyeglasses of FIG. 5.

FIG. 7 is a side elevational view of the eyeglasses of FIG. 5 and illustrates the operation of its range finding device.

FIG. 8 is a side elevational view of a pair of eyeglasses embodying the invention and similar to those of FIG. 5 except for using a different type of range finding device.

DETAILED DESCRIPTION OF THE PREFERRED EMBODIMENT

Figure 1:
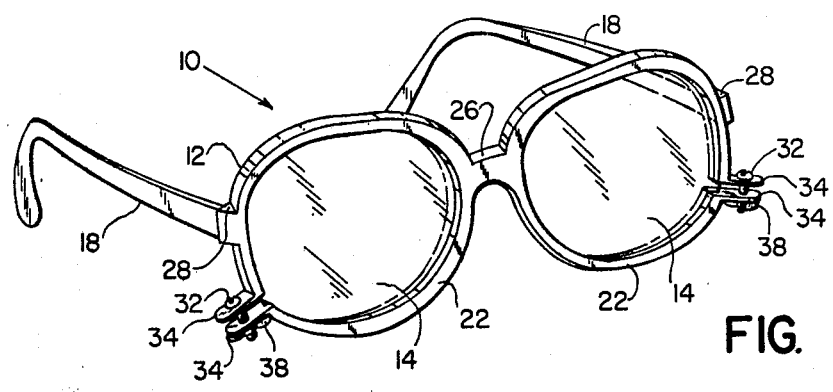
FIG. 1 is a perspective view illustrating a pair of eyeglasses embodying the present invention.

Turning now to the drawings in greater detail and referring to FIG. 1, a pair of eyeglasses, indicated generally at 10, embodies the variable focal length lens assembly of this invention. The eyeglasses 10 are conventional insofar as they include a lens frame 12, two lenses 14, 14, and a pair of earpieces 18, 18. The lens frame 12, which holds the lenses 14, 14, is preferably made of metal or plastic and has two rings 22, 22 joined by a bridge 26. When the eyeglasses 10 are worn, the bridge 26 rests across the user's nose and the lenses 14, 14 are positioned in his line of vision. The earpieces 18, 18 are attached to opposite sides of the lens frame 12 in a conventional manner by hinges 28, 28 so that they can be folded against the frame for storage.

Figure 2:
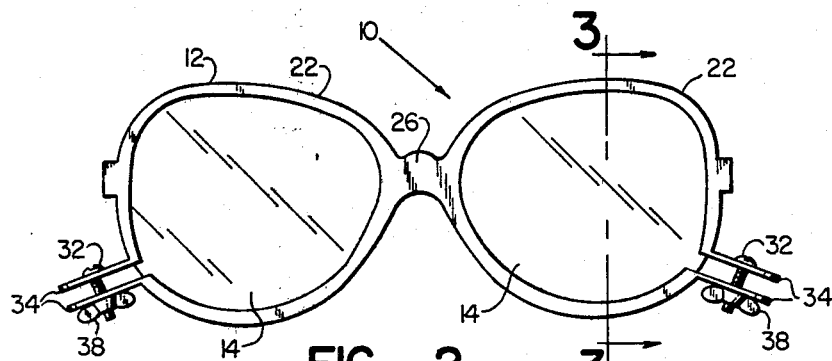
FIG. 2 is a front elevational view of the pair of eyeglasses shown in FIG. 1.

Referring to FIGS. 1 and 2, each ring 22 substantially surrounds its lens 14, is split at a point somewhat below its associated hinge 28 and on opposite sides of the split has two flanges 34, 34 which are apertured to receive the shank of a screw 32. A wing nut 38 is threadably received on the screw so that the flanges are held between the head of the screw and the wing nut, and preferably the portion of the screw adjacent its head and which passes through the upper flange 34 is of a noncircular opening in the flange so that the screw is held against rotation relative to the flange. As best illustrated in FIG. 3, each ring has an inwardly-opening channel 24 extending along its inside edge for receiving its lens 14.

In accordance with one aspect of the invention, each lens is a body made entirely of a resiliently deformable light conducting material, such as plastic, and is generally circular in the plane of the lens frame 12. As illustrated by the lens 14 in FIG. 3, the sides of each lens define curved surfaces 16, 16 and meet at a circumferential marginal portion engageably received by the channel 24 of the ring 22. Pressure applied and varied along the marginal portion causes the lens to expand or contract, in accordance with changes in the pressure, and thereby changes its focal length by changing the curvature of the surfaces 16, 16. The pressure can either be one, as in the illustrated case, which is directed inwardly toward the center of the lens or, alternatively, it can be one which pinches the lens surfaces toward one another along the marginal portion of the lens.

Figure 3:
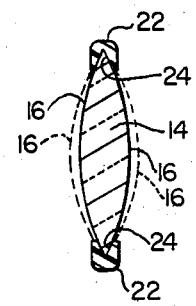
FIG. 3 is a cross-sectional view taken along the line 3—3 of FIG. 2.

Referring to FIG. 3, the lens 14 is shown by solid lines in one condition corresponding to a certain focal length. When the ends of the split ring 22 are drawn together by tightening the wing nut 38, the lens 16 expands to the condition shown in dotted lines and its focal length is changed. Therefore, to bring any object into viewing focus, a user of the eyeglasses 10 illustrated in FIGS. 1-3 needs only to adjust the two wing nuts 38, 38.

Figure 4:
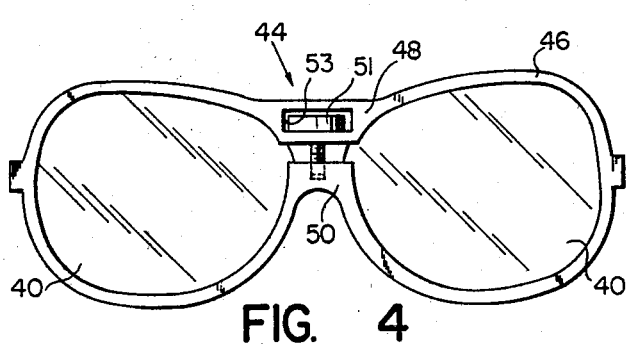
FIG. 4 is a front elevational view of a pair of eyeglasses comprising another embodiment of the invention.

Although the two lenses 14, 14 of the eyeglasses 10 illustrated in FIGS. 1-3 are adjustable independently of one another, it should be noted that a lens assembly made in accordance with the broad aspects of this invention is not necessarily so limited. For example, FIG. 4 shows a pair of eyeglasses 44 having both of its lenses 40, 40, each of which is similar to the lens 14, 14 of FIGS. 1 to 3, capable of adjustment by a single screw 39. The lens frame 46 has upper and lower portions 48 and 50, respectively, vertically spaced apart in the bridge area between the lenses. The shank of the screw 39 extends vertically and loosely through an aperture in the upper portion 48 of the frame and is threadably received in an internally threaded aperture in the lower portion 50. The head 51 of the screw is received in a slot 53 in the upper portion of the frame and can be manually rotated by the user's fingers. Tightening or loosening of the screw 39, by rotating its head, moves together or apart the upper and lower portions of the frame 46 and, by so varying the inwardly directed squeezing pressure applied by the frame to both lenses, simultaneously changes the focal length of both lenses 40, 40.

Figure 5:
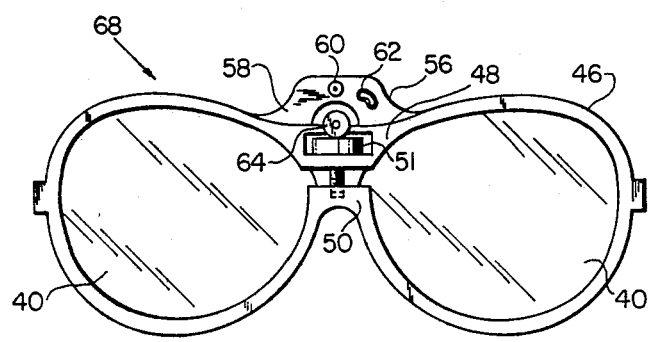
FIG. 5 is a front elevation view of a pair of eyeglasses comprising still another embodiment of the invention.

Instead of a manual adjustment, the focal length of the lenses of a pair of eyeglasses embodying this invention may also be adjusted automatically. For example, the eyeglasses 68 of FIG. 5 are similar to those of FIG. 4, except that they additionally include a range finder 56 and an automatic lens adjusting means 58. The range finder 56 is incorporated into the frame and includes a signal emitter 60, which directs a signal toward a viewed object in front of the frame 48. The range finder also includes a signal receiver 62 for receiving a portion of the signal reflected from the viewed object. A detector associated with the signal emitter 60 and receiver 62 automatically determines the distance to the object. The lens adjusting means 58 may take various different forms, but in the illustrated case is provided by a small reversible motor 64 mounted in the frame 48 and suitably drivingly connected with the head 51 of the screw so that operation of the motor 64 causes the screw to be rotated in one direction or the other to adjust the focal length of the lenses.

The control schematic of FIG. 6 illustrates the range finding and lens adjusting operation of the FIG. 5 eyeglasses. The motor 64 is energized to rotate in one direction or the other by command signals sent to it from the detector 66. Signals are sent from the signal emitter 60 toward the viewed object and the receiver 62 receives a portion of the signals reflected therefrom. The detector 66 senses or determines the distance to the viewed object from the sent and received signal information and from such determination produces the command signals sent to the lens adjustment motor 64.

The range finder 56 may be one using infrared signals or one using ultrasonic signals, and in either case may be of generally conventional construction and of the type sometimes used in cameras.

The operation of an infrared range finding device is illustrated in FIG. 7. Referring to this figure, a beam of infrared radiation having a frequency within the infrared frequency range of the electromagnetic energy spectrum is directed, as shown by the solid line 70, from the emitter 60 toward an object 72 to be viewed. The receiver 62 measures the peak intensity of the reflection, indicated by a dotted line 78. The detector 66 automatically translates this received intensity information into distance information, by comparing it with the peak intensity of the emitted signal, and sends command signals to the lens adjusting means which adjusts the lenses accordingly.

An ultrasonic range finding device, usable as the range finder 56 of FIG. 5, is illustrated in FIG. 8. The emitter 60' sends intermittent pulses of ultrasonic signals, depicted by the plurality of wave fronts 80, 80 concave to the left, toward the viewed object 88. The receiver 62' senses the reflected echoes, depicted by the plurality of wave fronts 86, 86 concave to the right, and the detector 66 determines the distance to the viewed object on the basis of the time it takes for the echoes to return. The detector then also translates this distance information into command signals sent to the motor 64 and used to adjust the lens accordingly.

Since the aforementioned descriptions are intended as illustrations and not as limitations, it will be understood that numerous modifications may be made to the lens and eyeglass apparatus without departing from the spirit of the invention. For example, eyeglasses having a range finding device which automatically adjusts its lens focal length in accordance with this invention is not necessarily limited to lenses made entirely of resiliently deformable material. Instead, a distensible envelope including two opposing flexible walls and containing a fluid between the walls may be used for each lens. In this case both the walls and fluid of the envelope are light conducting and the walls have curved surfaces which provide the envelope with lens characteristics. The walls are movable toward and away from one another and assume different curvatures as the pressure of the fluid is varied, so that a varying focal length is obtained as the fluid varies in pressure. The lens adjusting means in this case would include a means for varying the pressure of the fluid within the envelope in response to command signals from the detector 66.

I claim:

1. A variable focal length lens assembly comprising:
   a lens having two lens surfaces and a circumferential marginal portion, said lens consisting of a unitary body of resiliently deformable light conducting material so that the curvature of said two lens surfaces may be varied by varying a pressure applied to said lens along said marginal portion,
   a holder substantially surrounding said lens and engaging said marginal portion thereof so as to apply such a pressure to said lens,
   means for adjusting said holder to vary said pressure which it applies to said lens, and
   a range finder attached to said lens holder, said range finder including
   a signal emitter for projecting a distance sensing signal generally along a line toward an object to be brought into focus,
   a signal receiver for receiving a portion of said projected signal reflected from said object,
   a detector associated with said signal emitter and said signal receiver for producing a distance signal related to the distance between them and said object, and
   means for adjusting said holder to vary said pressure which it applies to said lens in response to said distance signal.

2. A variable focal length lens assembly as described in claim 1 wherein said signal emitter is an emitter of electromagnetic radiation having a frequency within a predetermined frequency range and wherein said signal receiver is a sensor of incident electromagnetic radiation within said predetermined frequency range.

3. A variable focal length lens assembly as described in claim 2 wherein said signal emitter is an infrared radiation emitter and wherein said signal receiver is an incident infrared radiation sensor.

4. A variable focal length lens assembly as described in claim 1 wherein said signal emitter is an ultrasonic wave emitter and wherein said signal receiver is an incident ultrasonic wave sensor.

5. An eyeglass apparatus comprising:
a frame to be worn by a user,
a lens supported by said frame so that said lens is in the line of vision of the user, said lens having a variable focal length,
a distance sensing signal emitter carried by said frame for projecting a distance sensing signal generally along said line of vision toward an object viewed by the user,
a signal receiver supported by said frame for receiving a portion of said projected signal reflected from said viewed object,
a detector associated with said signal emitter and said signal receiver for producing a distance signal related to the distance between said frame and said viewed object from which said signal is reflected, and
focal length adjusting means responsive to said distance signal for adjusting said focal length of said lens.

6. An eyeglass apparatus as described in claim 5 wherein said signal emitter is an emitter of electromagnetic radiation having a frequency within a predetermined frequency range and wherein said signal receiver is a sensor of incident electromagnetic radiation within said predetermined frequency range.

7. An eyeglass apparatus as described in claim 5 wherein said signal emitter is an ultrasonic wave emitter and wherein said signal receiver is an incident ultrasonic wave sensor.

8. An eyeglass apparatus as described in claim 6 or 7 wherein said lens has two lens surfaces and a circumferential marginal portion, said lens consisting of a unitary body of resiliently deformable light conducting material so that the curvature of said two lens surfaces may be varied by varying a pressure applied along said marginal portion, and wherein said focal length adjusting means includes means for applying and varying such pressure.

9. A method for automatically adjusting a pair of eyeglasses to the distance between them and an object being viewed, said method comprising the steps of:
providing a pair of eyeglasses having lenses of variable focal length and an adjustment means for adjusting said focal length,
sending signals toward an object to be viewed,
receiving a portion of said signals reflected from said object,
generating from said sent and received signals a distance signal representative of the distance between said eyeglasses and said viewed object, and
using said distance signal to control adjustment of said adjustment means.

* * * * *